(No Model.)
F. HOLDERMAN.
REVERSING MECHANISM FOR COUNTER SHAFTS.
No. 495,806. Patented Apr. 18, 1893.
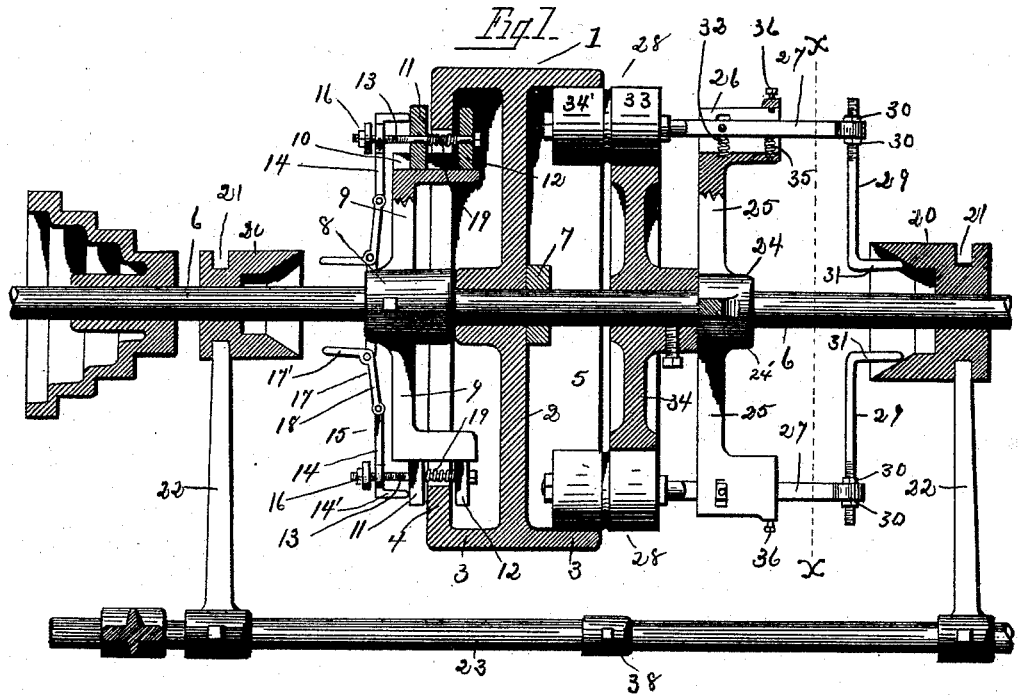
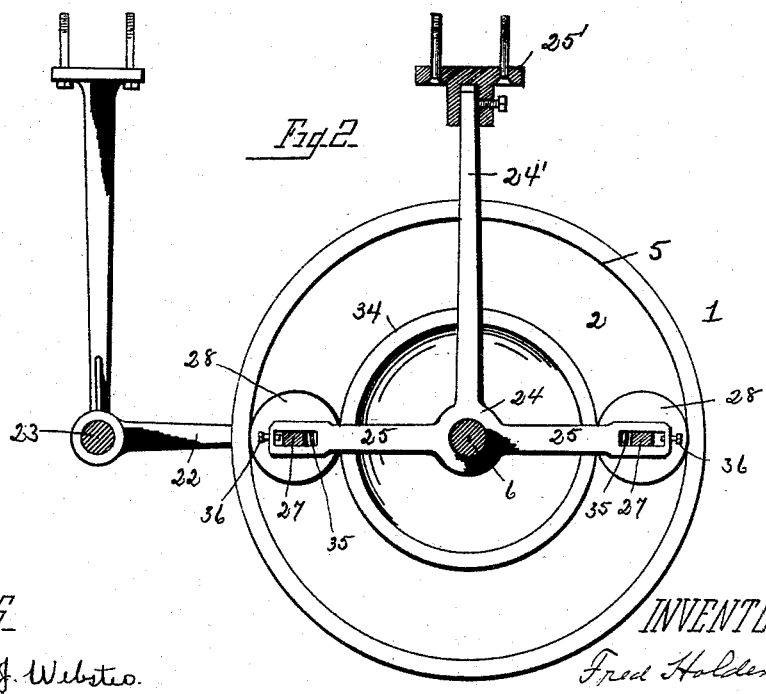
WITNESSES
Carroll J. Webster.
Floyd R. Webster
INVENTOR
Fred Holderman
By William Webster
atty

UNITED STATES PATENT OFFICE.

FRED HOLDERMAN, OF BOWLING GREEN, OHIO.

REVERSING MECHANISM FOR COUNTER-SHAFTS.

SPECIFICATION forming part of Letters Patent No. 495,806, dated April 18, 1893.

Application filed September 29, 1892. Serial No. 447,223. (No model.)

*To all whom it may concern:*

Be it known that I, FRED HOLDERMAN, of Bowling Green, county of Wood, and State of Ohio, have invented certain new and useful Improvements in Reversing Mechanism for Counter-Shafts; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to a reversing mechanism for counter shafts, and has for its object to provide a simple and effective gear, by which the direction of rotation of the counter shaft may be instantly changed, without the employment of cross belts, and complicated mechanism.

A further object is to control the rotation of the pulley or gear upon the power shaft by means of mechanism entirely upon the inner side of the same by frictional contact exerted concentrically to the rim, whereby lateral pressure upon the wheel is avoided.

The invention consists in the parts and the combination of parts hereinafter described and pointed out in the claims.

In the drawings: Figure 1 is a sectional plan view of a complete reversing mechanism, the top half being removed, where necessary to disclose the operative parts. Fig. 2 is a transverse view on line $x\ x$ Fig. 1, looking toward the pulley.

1 designates a pulley having a central web 2, from which the annular face 3 extends on each side, one of the side extensions of the face having an annular concentric flange 4, depending at right angles thereto which forms a clutch bearing, the opposite side extension having an annular friction surface 5 concentric to the face of the pulley.

6 designates a shaft upon which pulley 1 is loosely journaled, the pulley being held from longitudinal movement on the shaft by means of collar 7 upon one side and by the hub 8 upon the other.

9 designates arms integral with hub 8, the arms being at diametrically opposite sides of the hub and are formed on their outer faces with dove tailed grooves 10 in which loosely slide the gripping jaws 11 and 12. The gripping jaws are of a length to embrace the concentric annular flange 4, and are located one on each side of the flange, there being a bolt 13 passed through the same the head of the bolt being against the outside of jaw 12, and the opposite end passed through a perforation formed in an arm 14 of a toggle joint 15 and adjusted as to the movement of the arm by means of a nut or head 16, run upon the screw threaded end thereof.

Toggle joint 15 is composed of a bell crank lever 17 pivotally connected with hub 8 with one arm 17' normally extending parallel with the shaft, and the vertical arm 18 connected with arm 14, the latter being at right angles with a horizontal portion 14', extending oppositely to arm 17' and contacting with the upper end of the gripping jaw 11 the jaws being normally separated by means of a spring 19, coiled around bolt 13 between the jaws.

20 designates clutch collars loosely mounted upon shaft 6, each of which is formed with an annular groove 21, into which the arm 22 of a shifting bar 23 rests, whereby the collars may be moved simultaneously upon the shaft and maintain the same distance from each other.

Each collar 20 is formed with a conical recess upon the inner face in order to receive, guide and actuate arms with which they are brought in contact, the arms 17' heretofore described being actuated by the movement of one of the collars as it is advanced and the ends of the arms ride down the incline causing the vertical portion 18 to swing outwardly thereby forming a lever of arm 14, of which nut or head 16 is the fulcrum, the horizontal portion 14' contacting with, and moving jaw 11 frictionally against the side of flange 4, and the pull upon the bolt 13 drawing jaw 12 against the opposite side, thereby causing the pulley to revolve with the shaft.

So far the description has been confined to the peculiar form of clutch mechanism for causing the pulley and shaft to revolve in unison. I will now describe the reversing gear. 24 designates a collar having a vertical hanger arm 24', adjustably secured in plate 25', and oppositely disposed arms 25 in the ends of which are rectangular openings 26 through which are passed levers 27 having rollers 28 upon one end, the opposite ends being connected with angular arms 29 the vertical portions of which are adjustably secured therein by means of nuts 30, upon the screw threaded portions there being a nut upon each side of the arm, the horizontal portion 31 being parallel with the shaft, and projecting within the conical recess of collar 20 whereby when the collar is advanced the outer ends of the levers are pulled downwardly, and as the levers are fulcrumed upon a spring actuated pivot 32, the rollers 28 are moved so that one portion 33 contacts with a friction wheel 34 secured upon the shaft, and a portion 34' contacts with the inner face of the pulley, thereby reversing the direction of rotation of the pulley. It will be seen that the final result of pulling down upon the levers is to change the fulcrum from the pivot 32, and the wheel 34 becomes the fulcrum, and the rim of the wheel the weight so that any desired friction upon wheel 34 and the rim of the wheel can be attained.

In order to throw the levers 27 to a position to remove the rollers from contact with wheel 34, and the pulley rim when the collar 20 is retracted and the clutch engaged, a spring 35 is interposed between the lever and inner side of the opening 26, which like the spring actuated pivot 32 normally bears the levers radially from the shaft until the pivot pin strikes the upper end of the slot or opening 26, when spring 35 urges the outer end of the lever to a height to incline the inner end thereof sufficiently to remove the rollers from contact with the wheel and pulley, a set screw 36 limiting the movement of the outer end of the lever. Bar 23 is suspended in hangers 37, and is moved longitudinally by means of a bar (not shown) secured at 38, or in any other preferred manner.

While I have shown and described the shifting bar as having a separate bearing, I may form if desired castings for the shaft hanger with arms for securing the shifting bar. By means of the adjustability of the hanger arm 24' vertically the arm is applicable to different lengths of shaft hangers.

It will be seen by the foregoing description that I have provided for a convenient and instantaneous control of the counter shaft without lateral strain upon the pulley or gear, and in avoidance of sudden strain upon the parts.

What I claim is—

1. In a reversing mechanism for counter shafts, an armed hanger, levers pivotally secured in each arm, a shaft journaled in the hanger, a friction wheel secured upon the shaft, a pulley loose upon the shaft, rollers upon each of the levers of a length to bear upon the wheel and pulley, and means for rocking the levers to cause the rollers to contact with the wheel and pulley.

2. In a reversing mechanism for counter shafts, the counter shaft, the pulley loosely mounted thereon, having an annular clutch face, an armed hub upon the shaft gripping jaws running in a groove in each arm of the hub, one gripping jaw being on each side of the clutch face, rods passing through the jaws on each arm having heads, levers abutting against said heads to close the jaws, bell crank levers fulcrumed upon said hub, and pivoted to said first named levers, and a collar loosely mounted on the main shaft and having an internally cone shaped recess, and mechanism for shifting said collar.

3. In a reversing mechanism for counter shafts, the counter shaft, the pulley loosely mounted thereon having an annular clutch face, an armed hub upon the shaft, gripping jaws movably secured in each arm and embracing the annular clutch face, a rod passing through the jaws having a head on each end, a right angled lever, a bell crank lever pivoted at one end of said first named lever the other end bearing against one of the jaws and mechanism for operating the bell crank lever to close the jaws in combination with a spring on the rod between the jaws to open the same when the bell crank is released.

4. In a reversing mechanism for counter shafts, the counter shaft, the pulley loosely mounted thereon having an internal clutch face, a friction wheel secured upon the shaft, an armed hanger upon the shaft, levers pivoted in each arm of the hanger, rollers upon the levers of a length to bear upon the wheel and pulley, arms secured to the outer ends of said levers, an internally cone shaped collar on the shaft, and mechanism for moving the collar to cause the rollers to bear on the wheel and pulley.

5. In a reversing mechanism for counter shafts, the counter shaft, a pulley loosely mounted thereon a friction wheel secured thereto, a stationary armed hanger upon the shaft levers pivoted in the arms of said hanger, rollers upon the levers adapted to bear on said pulley and wheel when pressure is applied to the levers, spring bearings for said levers adapted to raise the levers and disengage the rollers from the pulley and wheel when pressure is withdrawn from the levers.

In testimony that I claim the foregoing as my own I hereby affix my signature in presence of two witnesses.

FRED HOLDERMAN.

Witnesses:
ALMER R. CAMPBELL,
H. S. CHAPIN.